(12) United States Patent
Suzaki (10) Patent No.: US 11,281,408 B2
(45) Date of Patent: Mar. 22, 2022

(54) CONTROL METHOD

(71) Applicant: CANON KABUSHIKI KAISHA, Tokyo (JP)

(72) Inventor: Ryo Suzaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 138 days.

(21) Appl. No.: 16/429,640

(22) Filed: Jun. 3, 2019

(65) Prior Publication Data

US 2019/0384538 A1  Dec. 19, 2019

(30) Foreign Application Priority Data

Jun. 14, 2018 (JP) .............................. JP2018-113946

(51) Int. Cl.
*G06F 3/12* (2006.01)
*H04L 29/08* (2006.01)
*G06F 3/0482* (2013.01)
*H04L 67/55* (2022.01)

(52) U.S. Cl.
CPC .......... *G06F 3/1204* (2013.01); *G06F 3/0482* (2013.01); *G06F 3/1232* (2013.01); *G06F 3/1255* (2013.01); *H04L 67/26* (2013.01); *G06F 3/1289* (2013.01); *G06F 3/1292* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0033844 A1* | 3/2002 | Levy | ..................... | G06F 3/0484 |
| | | | | 715/744 |
| 2014/0242955 A1* | 8/2014 | Kang | ..................... | G06F 40/58 |
| | | | | 455/414.1 |
| 2016/0034447 A1* | 2/2016 | Shin | ....................... | G06F 40/47 |
| | | | | 704/3 |
| 2016/0034449 A1* | 2/2016 | Davis | .................... | G06F 40/263 |
| | | | | 704/3 |
| 2016/0378306 A1* | 12/2016 | Kresl | ....................... | G06F 8/38 |
| | | | | 715/781 |
| 2019/0034132 A1* | 1/2019 | Yamada | ................ | G06F 3/1234 |

FOREIGN PATENT DOCUMENTS

JP          2017134628 A          8/2017

* cited by examiner

*Primary Examiner* — Fan Zhang
(74) *Attorney, Agent, or Firm* — Canon U.S.A., Inc. IP Division (57) ABSTRACT

A method for a communication system including a communication apparatus and a terminal apparatus. The communication apparatus transmits message information including first language information for expressing a message indicating predetermined information in a first language and second language information for expressing the message indicating the predetermined information in a second language different from the first language. Where the first language corresponds to a terminal supporting language selected by a user on a screen displayed on a display unit of the terminal apparatus, a process is executed that displays the message indicating the predetermined information based on the message information in the first language on the display unit. Where the first language does not correspond to the terminal supporting language, a process is executed that displays the message indicating the predetermined information based on the message information in the second language on the display unit.

23 Claims, 8 Drawing Sheets

CONTROL METHOD

BACKGROUND OF THE INVENTION

Field of the Invention

The present disclosure relates to a control method.

Description of the Related Art

A method has been known that receives notification information for displaying information regarding a communication apparatus such as a printer from an external apparatus and displays a notification screen by a terminal apparatus such as a smart phone based on the notification information, Japanese Patent Laid-Open No. 2017-134628 describes that a mobile terminal apparatus receives a push notification from a push notification distribution server and executes informing processing for informing the push notification.

The language of a message to be displayed on the notification screen may be determined based on the externally received notification information. However, Japanese Patent Laid-Open No. 2017-134628 does not consider the language of the message to be displayed on the notification screen. According to Japanese Patent Laid-Open No. 2017-134628, based on some externally received notification information, the language of the message displayed on the notification screen may not be read by a user disadvantageously.

The present disclosure was made in view of such an issue and increases the possibility that a message is displayed in a language that can be read by a user.

SUMMARY OF THE INVENTION

According to an aspect of the present disclosure, a control method for a communication system including a communication apparatus and a terminal apparatus includes transmitting, by the communication apparatus, message information including first language information for expressing a message indicating predetermined information in a first language and second language information for expressing the message indicating the predetermined information in a second language different from the first language, executing, in a case where the first language corresponds to a terminal supporting language selected by a user on a screen displayed on a display unit of the terminal apparatus, a process that displays the message indicating the predetermined information based on the message information in the first language on the display unit; and executing, in a case where the first language does not correspond to the terminal supporting language, a process that displays the message indicating the predetermined information based on the message information in the second language on the display unit.

Further features of the present disclosure will become apparent from the following description of embodiments with reference to the attached drawings.

DESCRIPTION OF THE EMBODIMENTS

Embodiments of the present disclosure will be illustratively described in detail below with reference to drawings. The scope of the present disclosure is not limited to the relative arrangement of components and display screens described according to embodiments unless otherwise specified and it is not intended that the scope of the present disclosure is limited to the relative arrangement of components and display screens described according to embodiments unless otherwise specified. The components may be changed without departing from the spirit and scope of embodiments.

First Embodiment

A terminal apparatus and a communication apparatus according to a first embodiment will be described. A smart phone is applied as an example of the terminal apparatus according to this embodiment. The smart phone is a multi-functional mobile phone including camera, web browser and electronic mail functions in addition to mobile phone functions. The terminal apparatus to which the present disclosure is applicable is not limited to a smart phone and may be any apparatus that can communicate with a communication apparatus, which will be described below. For example, as the terminal apparatus, a digital camera, a mobile phone, a personal computer (PC), a tablet terminal, a personal digital assistant (PDA) or the like is applicable. A personal computer (PC) is illustratively applied as the communication apparatus according to this embodiment, but embodiments are not limited thereto. The communication apparatus may be any of various apparatuses that can communicate with the terminal apparatus. For example, the communication apparatus is applicable to a printing apparatus, a copy machine, a facsimile apparatus, a smart phone, a mobile phone, a tablet terminal, a PDA, a digital camera, a music playing device, a storage, a projector, and a smart speaker. An ink-jet apparatus that may execute performing large-format printing is illustratively described as a printing apparatus to be controlled by the communication apparatus according to this embodiment, but embodiments are not limited thereto. For example, the printing apparatus may be an apparatus that performs printing based on a printing method (such as electrophotography and thermal sublimation) instead of an ink-jet method.

System Configuration

Figure 1:
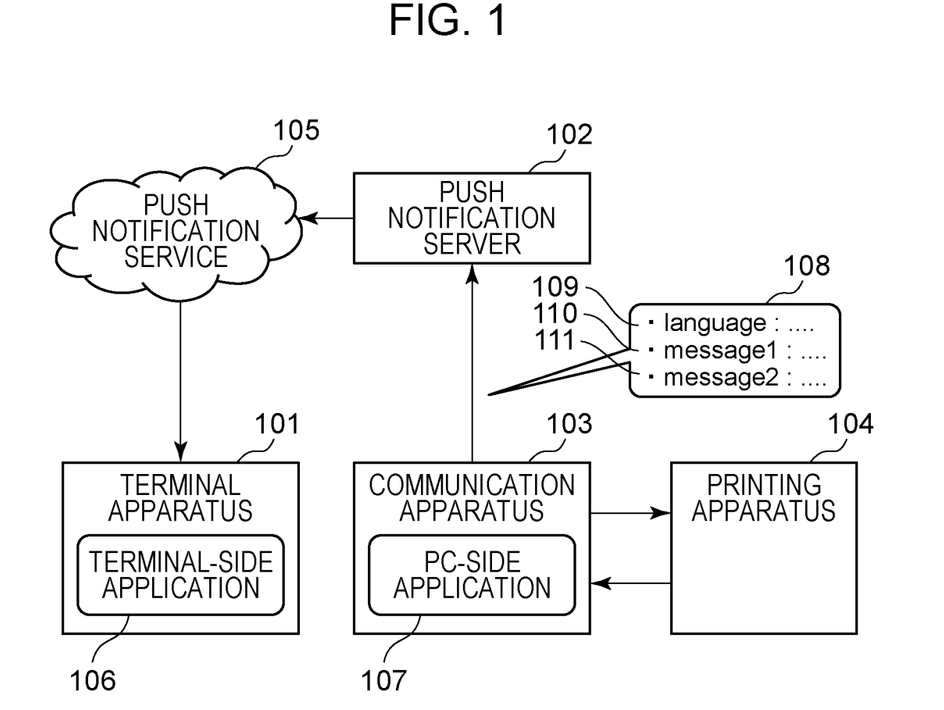
FIG. 1 is a diagram illustrating an example of a configuration of a communication system.

First, a system configuration that implements this embodiment will be described, FIG. 1 is a diagram illustrating an example of a configuration of a communication system according to this embodiment. The system includes a terminal apparatus 101, a push notification server 102, a communication apparatus 103, a printing apparatus 104, and a push notification service providing server (hereinafter, service providing server) 105.

The terminal apparatus 101 causes a display unit 608 to display information based on notification information transmitted from the service providing server 105. The terminal apparatus 101 holds a terminal-side application 106. The terminal-side application 106 has a function to analyze notification information transmitted from the service providing server 105 and notify the analysis result to an operating system (OS) of the terminal apparatus 101 to cause the OS to display a message based on the notification information. The terminal-side application 106 is connected with the printing apparatus 104 in a wireless manner so that the terminal-side application 106 has a function to transmit a print job to the printing apparatus 104 and cause the printing apparatus 104 to execute printing. The terminal apparatus 101 can communicate with the service providing server 105 over the Internet and receives notification information over the Internet. The terminal apparatus 101 may communicate with the Internet through a mobile communication network such as 4G or LTE or may communicate with the Internet through a Wi-Fi® connection with a wireless LAN router, not illustrated.

The communication apparatus 103 holds a PC-side application 107 and uses the PC-side application 107 to control the printing apparatus 104. More specifically, the communication apparatus 103 transmits a print job to execute printing to the printing apparatus 104 and receives a notification regarding the printing apparatus 104 from the printing apparatus 104. The notification regarding the printing apparatus 104 is, for example, a notification that printing executed by the printing apparatus 104 based on the print job has completed or a notification that an error message has occurred in the printing apparatus 104. When the communication apparatus 103 receives a notification regarding the printing apparatus 104 from the printing apparatus 104, the communication apparatus 103 transmits a notification message 108 (message information) based on the notification to the push notification server 102 so that information based on the notification is displayed on the terminal apparatus 101. The communication apparatus 103 may also display the information based on the notification on a display unit 508.

The information included in the notification message 108 may be data encrypted by using a security key that is shared by the push notification server 102 and the PC-side application 107. The information may be binary data, UTF-8 text data, for example, or data encoded by Base 64, for example.

When the push notification server 102 receives the notification message 108 from the communication apparatus 103, the push notification server 102 transmits notification information generated based on the notification message 108 to the terminal apparatus 101 through the service providing server 105. The push notification server 102 here may transmit the notification information to a plurality of terminal apparatuses 101 so that the information can be displayed on the plurality of apparatuses.

The service providing server 105 is a server that provides a push notification service. In this embodiment, an OS of the terminal apparatus 101 has a push notification function that displays a notification area on a display unit thereof based on a push notification. A push notification service corresponding to the OS is to be utilized to use the function. In other words, the push notification server 102 transmits the notification information through the service providing server 105 instead of direct transmission of the notification information to the terminal apparatus 101. The push notification service to be utilized depends on the OS of the terminal apparatus 101 that receives a notification by the push notification. In other words, the push notification server 102 transmits notification information to the terminal apparatus 101 through the service providing server 105 depending on the OS of the terminal apparatus 101 that is a target of the push notification. The communication between the push notification server 102 and the terminal apparatus 101 is one-way communication in which the push notification server 102 can actively access the terminal apparatus 101.

According to this embodiment, each of the push notification server 102 and the service providing server 105 is configured by one server. However, embodiments are not limited thereto. A plurality of servers may operate in cooperation to construct a server system corresponding to the push notification server 102 or the service providing server 105.

Internal Configurations of Apparatuses

Figure 5:
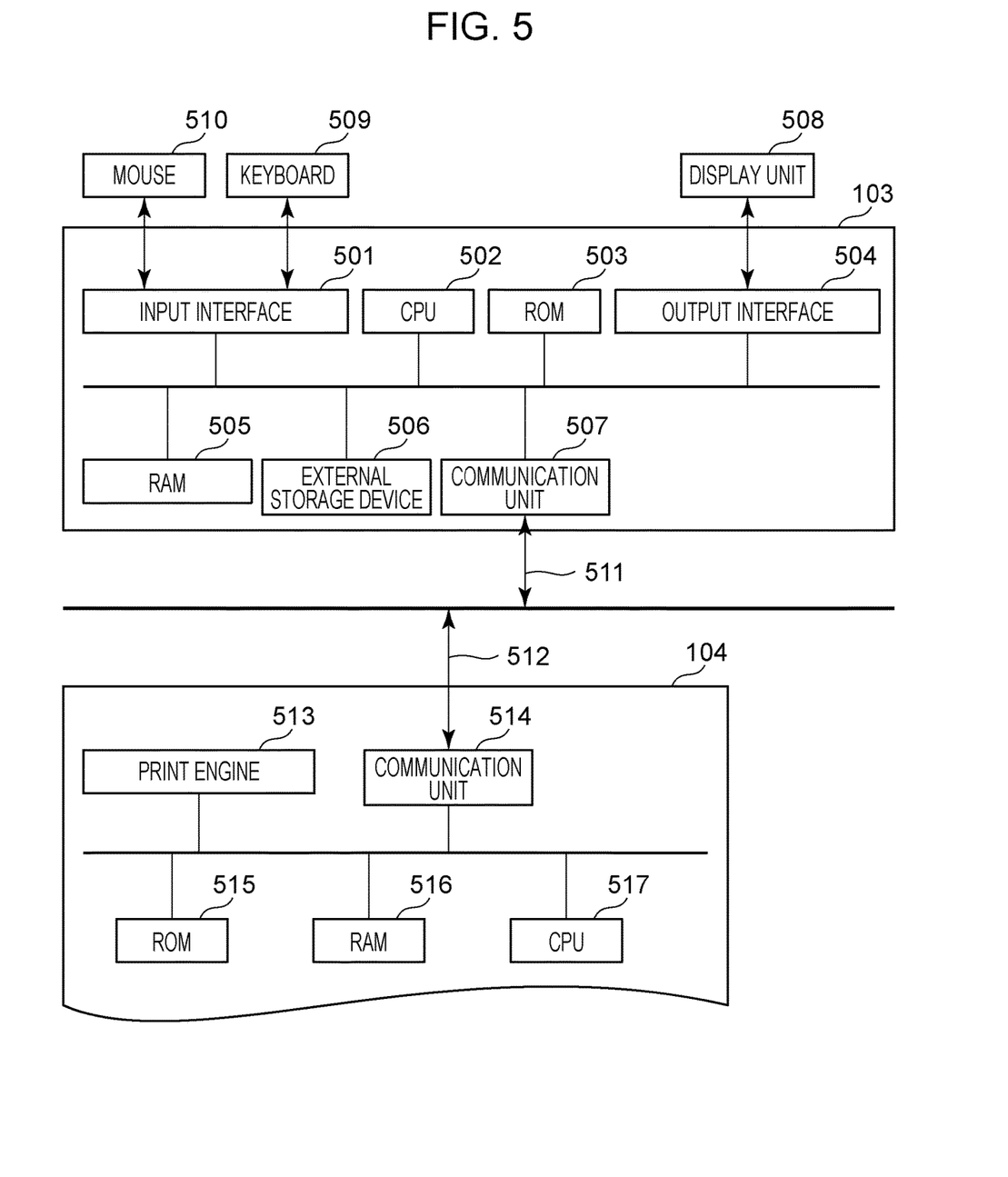
FIG. 5 is a diagram illustrating examples of configurations of a communication apparatus and a printing apparatus.

Configurations of the communication apparatus 103 and the printing apparatus 104 will be described with reference to a block diagram in FIG. 5.

The communication apparatus 103 includes an input interface 501, a CPU 502, a ROM 503, an output interface 504, a RAM 505, an external storage device 506, and a communication unit 507. The CPU 502 and the ROM 503 are included in a computer of the communication apparatus 103.

The input interface 501 is an interface configured to receive a data input or an operation instruction from a user by operating a mouse 510 or a keyboard 509.

The CPU 502 is a system control unit and is configured to control the communication apparatus 103 overall.

The ROM 503 stores fixed data such as a control program to be executed by the CPU 502, a data table, and an embedded operating system (hereinafter, an OS) program. According to this embodiment, a control program stored in the ROM 503 controls software execution of scheduling, task switching, interrupt processing and so on under management of the embedded OS stored in the ROM 503.

The RAM 505 is configured by a static random access memory (SRAM), for example, using a backup power supply. The RAM 505 holds data by using a primary battery for data backup, not illustrated, so that important data such as program control variables can be stored without volatizing the data. The RAM 505 further has a memory area that stores setting information for the communication apparatus 103 and management data for the communication apparatus 103. The RAM 505 is also used as a main memory and a work memory for the CPU 502.

The external storage device 506 stores programs such as the PC-side application 107 that controls the printing apparatus 104 connected through the communication unit 507 and generates a print job interpretable by the printing apparatus 104 and information to be used by the programs.

The output interface 504 is an interface that performs a control for displaying, by the display unit 508, of a screen based on data or a notification received from the printing apparatus 104.

The display unit 508 is configured by a light emitting diode (LED) display or a liquid crystal display (LCD), for example, and displays a screen based on data or a notification received from the printing apparatus 104. An operating unit such as a numeral input key, a mode setting key determination key, a cancel key, and a power key may be provided on the display unit 508 to receive an input from a user through the display unit 508.

The communication unit 507 is connected with another apparatus to execute data communication. For example, the communication unit 507 can be connected with an access point (not illustrated) within the printing apparatus 104. The connection between the communication unit 507 and the access point within the printing apparatus 104 allows mutual communication between the communication apparatus 103 and the printing apparatus 104. The communication unit 507 may directly communicate with the printing apparatus 104 by wireless communication or through an external apparatus that is provided externally to the communication apparatus 103 and the printing apparatus 104. The external apparatus includes an external access point provided externally to the communication apparatus 103 and externally to the printing apparatus 104 or an apparatus that is not an access point but can relay communication. The wireless communication may be based on a method such as Wireless Fidelity (Wi-Fi) (registered trademark), Bluetooth Low Energy (BLE) (registered trademark), or Bluetooth Classic (registered trademark). The external access point may be an apparatus such as a wireless LAN router. The communication method to be utilized by the communication unit 507 is not limited to a wireless communication method but may be a wired communication method using, for example, a universal serial bus (USB) or a wired LAN.

The communication unit 507 may utilize the Internet through an external apparatus such as a wireless LAN router so that the communication unit 507 can communicate with the push notification server 102 over the Internet.

The communication apparatus 103 may have a plurality of communication units to communicate with other apparatuses based on different communication methods. The communication unit to be used for communication between the communication apparatus 103 and the printing apparatus 104 may be different from the communication unit to be used for communication between the communication apparatus 103 and the push notification server 102.

The printing apparatus 104 has a print engine 513, a communication unit 514, a ROM 515, a RAM 516, and a CPU 517. The CPU 517 and the ROM 515 are included in a computer of the printing apparatus 104.

The communication unit 514 is connected with another apparatus to execute data communication. For example, the communication unit 514 has an access point to connect with an apparatus such as the communication apparatus 103 as the access point within the printing apparatus 104. The access point can connect with the communication unit 507 in the communication apparatus 103. The communication unit 514 may communicate with the communication apparatus 103 directly or through an external apparatus by wireless communication. The communication method may be Wi-Fi (registered trademark) or Bluetooth (registered trademark), for example. The communication unit 514 may include a hardware module functioning as an access point or may operate as an access point by using a software module causing the communication unit 514 to function as an access point. The communication method to be utilized by the communication unit 514 is not limited to a wireless communication method but may be a wired communication method using a USB or a wired LAN, for example.

The RAM 516 is configured by an SRAM, for example, using a backup power supply. The RAM 516 holds data by using a primary battery for data backup, not illustrated, so that important data such as program control variables can be stored without volatizing the data. The RAM 516 further has a memory area that stores setting information for the printing apparatus 104 and management data for the printing apparatus 104. The RAM 516 is also used as a main memory and a work memory for the CPU 517 and functions as a reception buffer that temporarily saves printing information received from the communication apparatus 103, for example, and stores information.

The ROM 515 stores fixed data such as a control program to be executed by the CPU 517, a data table, and an OS program. According to this embodiment, a control program stored in the ROM 515 controls software execution of scheduling, task switching, interrupt processing and so on under management of the embedded OS stored in the ROM 515.

The CPU 517 is a system control unit and controls the printing apparatus 104 overall.

The print engine 513 forms an image on a recording medium such as paper by applying a recording material (ink) onto the recording medium based on information stored in the RAM 516 or a print job received from the communication apparatus 103, for example, and outputs a printing result.

A memory such as an external HDD or an SD card may be attached to the printing apparatus 104 as an optional device, and information to be stored in the printing apparatus 104 may be stored in the memory.

Figure 6:
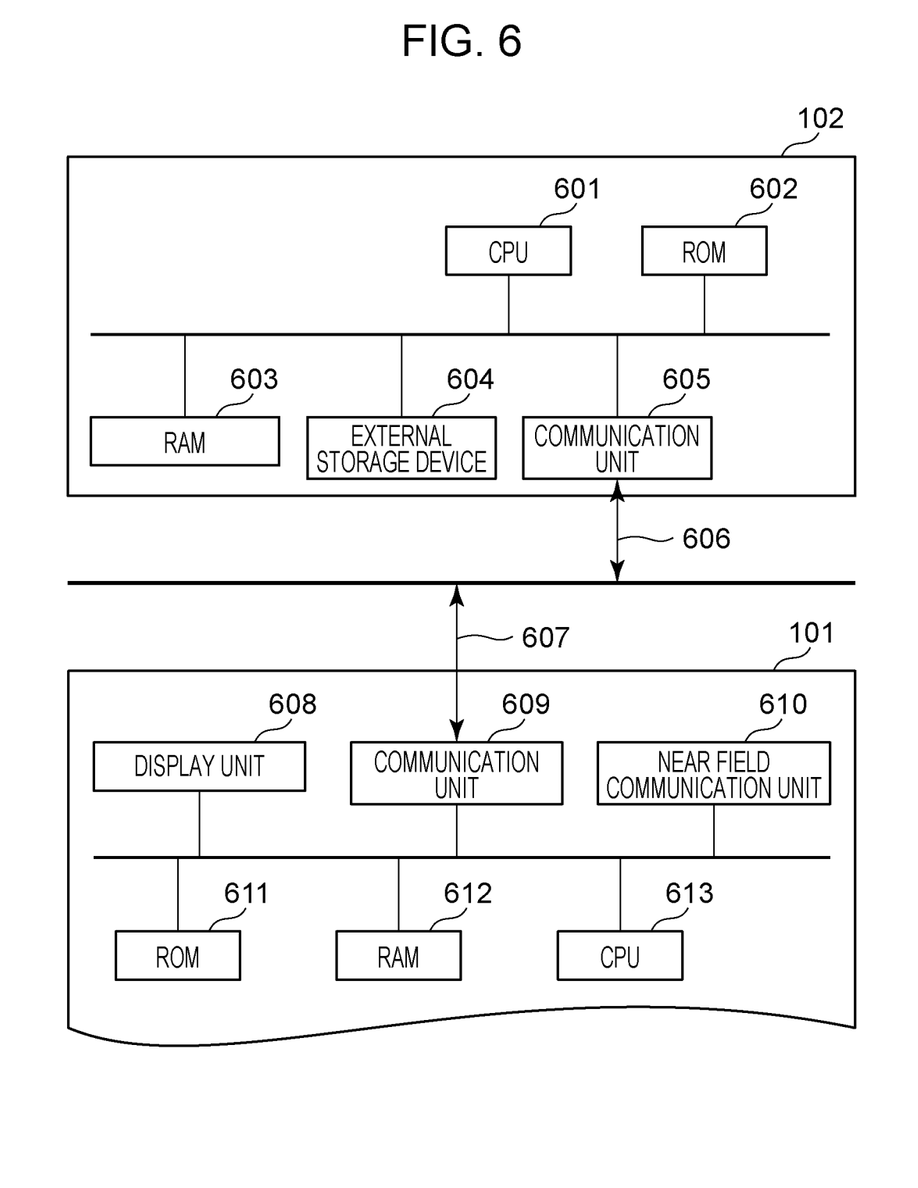
FIG. 6 is a diagram illustrating examples of configurations of a push notification server and a terminal apparatus.

Configurations of the push notification server 102 and the terminal apparatus 101 will be described with reference to a block diagram in FIG. 6.

The push notification server 102 has a CPU 601, a ROM 602, a RAM 603, an external storage device 604, and a communication unit 605. The CPU 601 and the ROM 602 are included in a computer of the push notification server 102.

The CPU 601 is a system control unit and controls the push notification server 102 overall.

The ROM 602 stores fixed data such as a control program to be executed by the CPU 601, a data table, and an OS program. According to this embodiment, a control program stored in the ROM 602 controls software execution of scheduling, task switching, interrupt processing and so on under management of the embedded OS stored in the ROM 602.

The RAM 603 is configured by an SRAM, for example, using a backup power supply. The RAM 603 holds data by using a primary battery for data backup, not illustrated, so that important data such as program control variables can be stored without volatizing the data. The RAM 603 further has a memory area that stores setting information for the push notification server 102 and management data for the push notification server 102. The RAM 603 is also used as a main memory and a work memory for the CPU 601.

The external storage device 604 stores a program that performs a push notification to the terminal apparatus 101 by utilizing the service providing server 105, for example.

The communication unit 605 is configured to execute data communication with another apparatus. The communication unit 605 can communicate with the communication apparatus 103 and an external server providing the service providing server 105, for example, over the Internet.

The push notification server 102 may have a plurality of communication units to communicate with other apparatuses based on different communication methods. The communication unit to be used for communication between the push notification server 102 and the communication apparatus 103 may be different from the communication unit to be used for communication between the push notification server 102 and the external server providing the service providing server 105.

It is assumed that the service providing server 105 has the same configuration as the configuration of the push notification server 102.

The terminal apparatus 101 has a display unit 608, a communication unit 609, a near field communication unit 610, a ROM 611, a RAM 612, and a CPU 613. The CPU 613 and the ROM 611 are included in a computer of the terminal apparatus 101.

The CPU 613 is a system control unit and controls the terminal apparatus 101 overall.

The ROM 611 stores fixed data such as a control program to be executed by the CPU 613, a data table, and an OS program. According to this embodiment, a control program stored in the ROM 611 controls software execution of scheduling, task switching, interrupt processing and so on under management of the embedded OS stored in the ROM 611. The ROM 611 holds an OS such as iOS provided by Apple or Android provided by Google. The ROM 611 stores programs such as the terminal-side application 106 that analyzes received notification information and displays a screen based on notification information and information to be used by the programs.

The RAM 612 is configured by an SRAM, for example, using a backup power supply. The RAM 612 holds data by using a primary battery for data backup, not illustrated, so that important data such as program control variables can be stored without volatizing the data. The RAM 612 further has a memory area that stores setting information for the terminal apparatus 101 and management data for the terminal apparatus 101. The RAM 612 is also used as a main memory and a work memory for the CPU 613.

The display unit 608 is configured by a light emitting diode (LED) display or a liquid crystal display (LCD), for example, and displays a screen based on data or notification information. An operating unit such as a numeral input key, a mode setting key determination key, a cancel key, and a power key may be provided on the display unit 608 to receive an input from a user through the display unit 608.

The communication unit 609 is configured to execute data communication with another apparatus. For example, the communication unit 609 is connected with an external apparatus such as a wireless LAN router and utilizes the Internet so that the communication unit 609 receives information from the push notification server 102 and the communication apparatus 103 over the Internet. The wireless communication method to be utilized by the communication unit 609 may be a method such as Wireless Fidelity (Wi-Fi) (registered trademark), Bluetooth Low Energy (BLE) (registered trademark), or Bluetooth Classic (registered trademark). The communication method to be utilized by the communication unit 609 is not limited to a wireless communication method but may be a wired communication method using a universal serial bus (USB) or a wired LAN, for example.

The near field communication unit 610 is configured to wirelessly connect with another apparatus in a short distance. The communication is based on a method such as Bluetooth® or Wi-Fi Aware™. According to this embodiment, it is assumed that the near field communication unit 610 executes communication based on BLE and Bluetooth Classic (registered trademark) as Bluetooth functions. According to this embodiment, the communication unit 609 can perform communication at a higher speed than that by the near field communication unit 610. It is assumed that the communicable distance by the communication unit 609 is longer than the communicable distance by the near field communication unit 610.

Registration Processing for Push Notification

In order to transmit a push notification to the terminal apparatus 101, registration processing for the push notification is to be executed in advance. The processing in the communication apparatus 103 relating to registration processing, which will be described below, is implemented by the PC-side application 107 executed by the CPU 502. The processing in the terminal apparatus 101 relating to the registration processing, which will be described below, is implemented by the terminal-side application 106 executed by the CPU 613.

First, the communication apparatus 103 displays a matrix barcode (or two-dimensional barcode), such as a Quick Response (QR) code (registered trademark)), on the display unit 508 in accordance with a predetermined operation for matrix barcode generation from a user.

Next, the terminal apparatus 101 reads the matrix barcode by using a camera, not illustrated, included in the terminal apparatus 101. The terminal apparatus 101 analyzes the read matrix barcode to acquire identification information of the PC-side application 107 having generated the matrix barcode and user information registered with the PC-side application 107 having generated the matrix barcode.

Next, the terminal apparatus 101 transmits the identification information of the terminal apparatus 101 and the information acquired by the analysis of the matrix barcode as registration information to the push notification server 102 over the Internet (information transmission step). It is assumed that the address and server name of the push notification server 102 to be used as a destination address of the registration information are prestored in the terminal-side application 106. The identification information of the terminal apparatus 101 includes a device token for receiving the push notification and OS information (such as an OS type and an OS version) regarding the OS held in the terminal apparatus 101, for example. The device token is information provided by the OS held in the terminal apparatus 101 and includes identification information of the terminal-side application 106, for example.

The information to be transmitted to the push notification server 102 may not be acquired from such a matrix barcode. For example, the terminal apparatus 101 first reads information in a text format displayed by the communication apparatus 103 by using a camera, not illustrated, included in the terminal apparatus 101. The read information may be analyzed by using optical character recognition/reader (OCR) so that the information to be transmitted to the push notification server 102 is extracted. Alternatively, for example, the terminal apparatus 101 may connect with the communication apparatus 103 by a wireless communication method or a wired communication method and may obtain the information to be transmitted to the push notification server 102 through the connection.

Thus, the push notification server 102 recognizes from which PC-side application 107 notification information based on a notification message is received and to which terminal apparatus 101 the notification information to be transmitted. In this manner, the registration processing is completed.

Having described that, according to this embodiment, identification information of the PC-side application 107 and identification information of the terminal apparatus 101 are managed in association by the push notification server 102, embodiments are not limited thereto. For example, from a matrix barcode, the identification information of the communication apparatus 103 displaying the matrix barcode may be obtained. The identification information of the communication apparatus 103 and the identification information of the terminal apparatus 101 may be managed in association by the push notification server 102. In this case, the push notification server 102 recognizes from which communication apparatus 103 notification information based on a notification message is received and to which terminal apparatus 101 the notification information is to be transmitted. For example, the terminal apparatus 101 may read a matrix barcode to acquire the identification information of the printing apparatus 104 controlled by the PC-side application 107. Then, the identification information of the printing apparatus 104 and the identification information of the terminal apparatus 101 may be managed in association by the push notification server 102, In this case, the push notification server 102 recognizes which printing apparatus 104 the notification information based on a notification message is regarding and to which terminal apparatus 101 the notification information is to be transmitted.

The registration processing may also be executed by a method which will be described below, for example. First, the terminal apparatus 101 connects to the communication apparatus 103 by a wireless communication method or a wired communication method and transmits the identification information of the terminal apparatus 101 to the communication apparatus 103 through the connection. The communication apparatus 103 transmits the identification information of the PC-side application 107 and the identification information of the terminal apparatus 101 as registration information to the push notification server 102 over the Internet. Thus, the identification information of the PC-side application 107 and the identification information of the terminal apparatus 101 are managed in association by the push notification server 102, which also results in completion of the registration processing. Also through this registration processing, the identification information of the communication apparatus 103 and the identification information of the terminal apparatus 101 may be managed in association by the push notification server 102. The identification information of the printing apparatus 104 and the identification information of the terminal apparatus 101 may be managed in association by the push notification server 102.

The transmission method for the registration information in the registration processing is not particularly limited. For example, an HTTP method may be applied in which the registration information is converted to an HTML, format for transmission, or an FTP method may be applied in which the registration information is generated in a file format so that the file is transmitted.

The registration information may be data encrypted with a security key shared by the push notification server 102 and the terminal-side application 106. The data may be binary data, UTF-8 text data, for example, or data encoded based on a method such as Base 64.

Push Notification

The push notification is a notification method that transmits a notification to the terminal apparatus 101 by using a push notification service.

Figure 3:
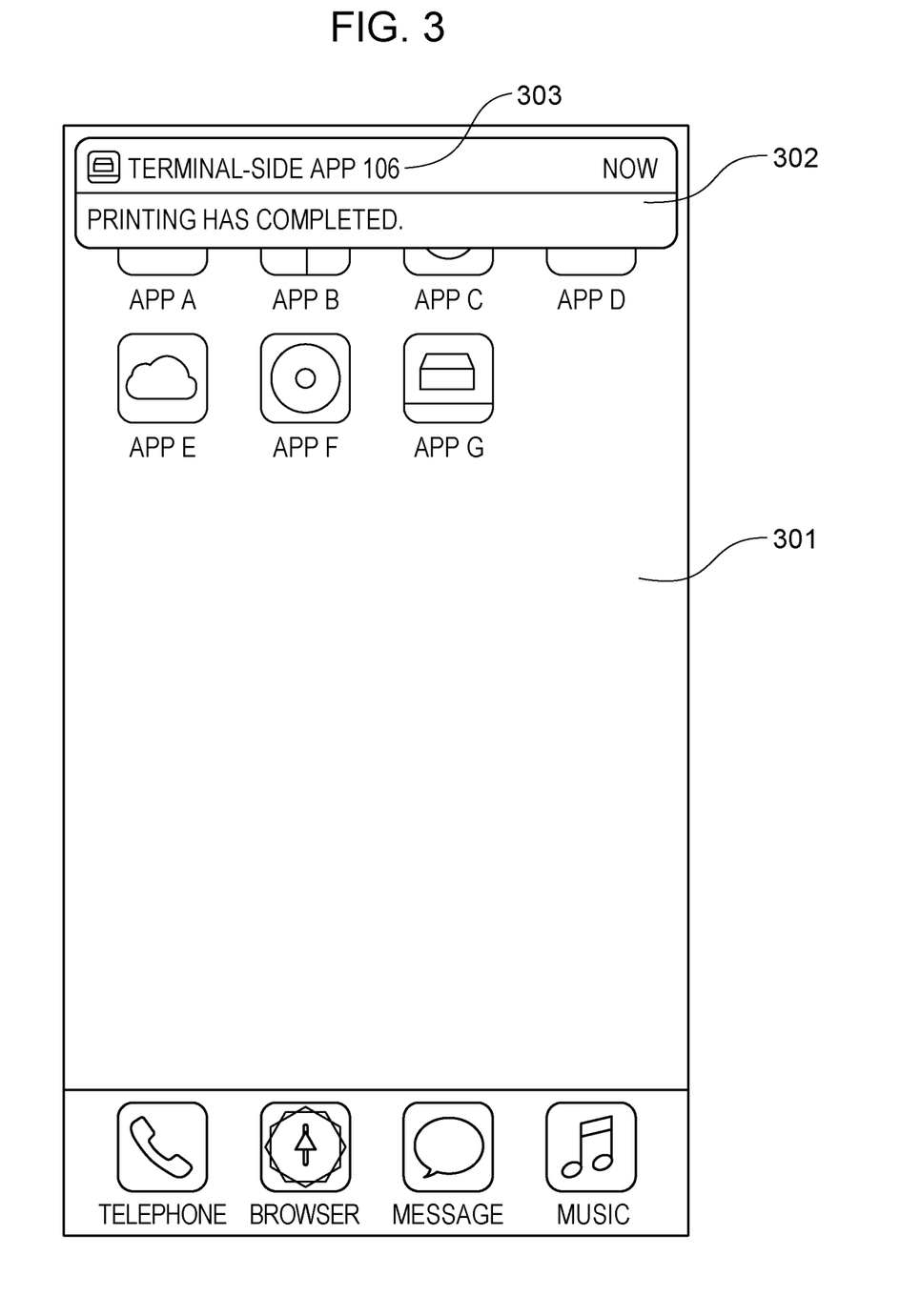
FIG. 3 illustrates an example of a screen displaying a notification area by a push notification function.

According to this embodiment, the communication apparatus 103 transmits information regarding the printing apparatus 104 as a notification message 108 to the push notification server 102. The push notification server 102 transmits to the terminal apparatus 101 through the service providing server 105 the notification information based on the notification message 108 for displaying a message included in the notification message 108. Thus, the push notification server 102 notifies the terminal apparatus 101 of the information regarding the printing apparatus 104. When the terminal apparatus 101 receives the notification information, a notification area that notifies a message corresponding to the notification information and included in the notification message 108 is newly displayed on a screen displayed by the display unit 608. FIG. 3 illustrates an example of the screen displaying the notification area by the push notification function. A maximum area 301 is the largest area displayable by the display unit 608, and a notification area 302 notifies a message included in the notification message 108. An area 303 displays an icon indicating to which application the displayed notification area corresponds and information regarding a name of the application corresponding to the displayed notification area. According to this embodiment, the application corresponding to the notification area displayed by the notification executed by the PC-side application 107 on the communication apparatus 103 is the terminal-side application 106.

According to this embodiment, the push notification function that displays the notification area on the display unit in response to a push notification is implemented by the OS included in the terminal apparatus 101. The push notification function is a function that can transmit a notification to the terminal-side application 106 even when the terminal-side application 106 is not activated on the terminal apparatus 101. In other words, by using the push notification function, the terminal apparatus 101 can display the notification area 302 even in a state that the terminal-side application 106 runs at the background, a state that the terminal-side application 106 is not activated, or a state that a home screen is displayed.

The OS of the terminal apparatus 101 displays a message by using the language supported by the terminal apparatus 101 by priority on a screen displayed by the OS of the terminal apparatus 101. The language supported by the terminal apparatus 101 is a language selected by a user through a selection screen displayed on the display unit 608 by a setting application held by the terminal apparatus 101 among a plurality of languages corresponding to language information held by the OS of the terminal apparatus 101, for example. In other words, the language supported by the terminal apparatus 101 is generally a language readable by a user. The plurality of languages corresponding to the language information held by the OS of the terminal apparatus 101 corresponds to a plurality of languages displayable by the terminal apparatus 101 based on the OS.

However, the language of a message displayed on the notification area 302 by the push notification function is determined based on notification information independently of the language supported by the terminal apparatus 101. The language determined based on notification information is a language supported by the communication apparatus 103 that is a transmission source of the notification message 108 or a language supported by the PC-side application 107 within the communication apparatus 103, for example. The language determined based on notification information is the language of a message included in the notification message 108. The language determined based on notification information may not be the language supported by the terminal apparatus 101 or may not agree with the language readable by a user.

In other words, in a case where the language determined based on notification information is not supported by the terminal apparatus 101, a user cannot read the message displayed on the notification area 302. For example, some terminal apparatuses 101 may not display a message in an unsupported language even in response to a push notification. In a case where the language determined based on notification information is not supported by such a terminal apparatus 101, the terminal apparatus 101 cannot display the corresponding message even in response to a push notification.

In the past, a message included in the notification message 108 is based on one language, and one language is determined based on notification information. However, in a case where one language is determined based on notification information, there is a high possibility that the language determined based on the notification information is not supported by the terminal apparatus 101, easily causing the issue as described above.

In the communication system as illustrated in FIG. 1, the service providing server 105 can access the terminal apparatus 101, but the terminal apparatus 101 cannot access the service providing server 105. Therefore, in a case where the notification information received by the terminal apparatus 101 corresponds to a language not supported by the terminal apparatus 101, the terminal apparatus 101 cannot request the service providing server 105 new notification information corresponding to the language supported by the terminal apparatus 101.

In order to work towards addressing the issue, this embodiment executes a control that increases the possibility to display a notification screen in a language readable by a user.

The control according to this embodiment will specifically be described. According to this embodiment, the communication apparatus 103 transmits to the push notification server 102 a first message 110 corresponding to a first language and a second message 111 corresponding to a second language different from the first language as the notification message 108. The communication apparatus 103 further transmits language information 109 indicating which language the first language is as the notification message 108. The first message 110 and the second message 111 desirably have an identical content in different languages except for a case where it is difficult to express the content in the same manner between the different languages. Also, for example, the first message 110 corresponding to the first language includes at least the first language and may also include a language different from the first language. For example, in a case where the first language is Japanese, the first message 110 includes an alphabet and so on.

When the push notification server 102 receives the notification message 108 from the communication apparatus 103, the push notification server 102 transmits notification information generated based on the notification message 108 to the terminal apparatus 101 through the service providing server 105. The notification information to be generated is information for displaying the first message 110 corresponding to the first language on the terminal apparatus 101 and is also information for displaying the second message 111 corresponding to the second language. In other words, two of the first language and the second language are the languages supported by the generated notification information.

After receiving the notification information from the push notification server 102 through the service providing server 105, the terminal apparatus 101 analyzes the notification information. More specifically, the terminal apparatus 101 determines whether the language (or the first language) indicated in the language information 109 is a language supported by the terminal apparatus 101 or not. If the language indicated in the language information 109 is a language supported by the terminal apparatus 101, the first message 110 is displayable. Therefore, the terminal apparatus 101 displays the first message 110 in the notification area 302. On the other hand, if the language indicated in the language information 109 is not a language supported by the terminal apparatus 101, the terminal apparatus 101 displays the second message 111 in the notification area 302.

According to this embodiment, as described above, a plurality of messages corresponding to different languages is included in the notification message 108. Thus, the notification information to be transmitted to the terminal apparatus 101 supports the plurality of languages.

For example, there may be a case where the terminal apparatus 101 does not support the first language but supports the second language. In this case, according to this embodiment, a message is displayed in the notification area 302 by using the second language that is more highly possibly readable by a user instead of the first language that is more highly possibly not readable by a user. Thus, this embodiment allows easy display of a message by using a language readable by a user, compared with a configuration in which notification information transmitted to the terminal apparatus 101 supports one language.

Figure 7:
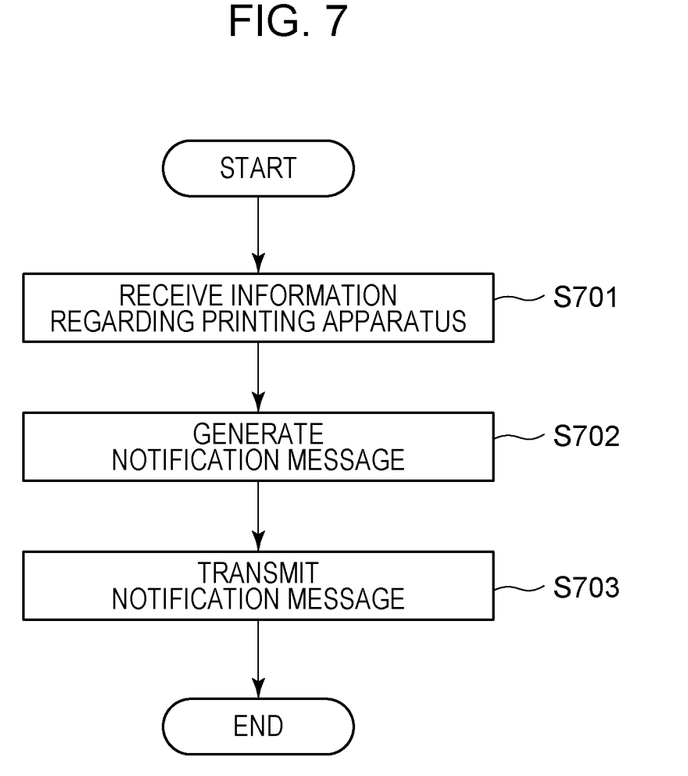
FIG. 7 is a flowchart illustrating processing to be executed by the communication apparatus.

FIG. 7 is a flowchart illustrating processing to be executed by the communication apparatus 103 according to this embodiment. The processes illustrated in the flowchart in FIG. 7 are implemented by the PC-side application 107 stored in the ROM 503, for example, and read to the RAM 505 and executed by the CPU 502, for example.

First, in S701, the CPU 502 receives a notification regarding the printing apparatus 104 from the printing apparatus 104. The CPU 502 may perform a polling operation to the printing apparatus 104 to receive the notification regarding the printing apparatus 104 or may receive the notification transmitted actively from the printing apparatus 104.

Next, in S702, the CPU 502 generates the notification message 108 based on the notification received in S701. The notification message 108 to be generated here includes, as described above, the language information 109 indicating which language the first language is, the first message 110 corresponding to the first language, and the second message 111 corresponding to the second language. The language information 109 may be a language code based on a language code standard such as ISO 639-1 or may be unique identification information that can be recognized by the terminal apparatus 101 and the push notification server 102. Language information indicating which language the second language is may also be included in the notification message 108. The language information 109 may not be included in the notification message 108. In this case, which language the first language is can be identified through analysis of the first message 110.

According to this embodiment, the first language is a language supported by the communication apparatus 103 (hereinafter, called apparatus supporting language). The apparatus supporting language is specifically a language that is supported by the PC-side application 107, for example, and is to be used on a screen displayed by the PC-side application 107. The language supported by the PC-side application 107 is first selected by a user when the PC-side application 107 is installed. After the PC-side application 107 is installed, the PC-side application 107 can display a screen for changing the supporting language, and the apparatus supporting language may be changed in accordance with a user operation received on the screen. Also, the apparatus supporting language is specifically, for example, a language selected by a user through a selection screen displayed on the display unit 508 by a setting application held by the communication apparatus 103 among a plurality of languages corresponding to the language information held by the OS of the communication apparatus 103.

Each time the apparatus supporting language is changed, the first language is dynamically changed. However, the second language is fixed to a predetermined language such as English, Japanese, Mandarin Chinese, Spanish, or German, irrespective of which language the apparatus supporting language is.

However, embodiments are not limited thereto, but the first language and the second language may be any languages. Alternatively, for example, the CPU 502 may identify the language supported by the printing apparatus 104 as the first language. The language supported by the printing apparatus 104 is a language selected by a user through a selection screen displayed on the display unit of the printing apparatus 104 by the setting application in the printing apparatus 104 among a plurality of languages corresponding to the language information held by the printing apparatus 104, for example. The second language may also be changed dynamically in accordance with the apparatus supporting language, for example.

Having described that, according to this embodiment, two messages expressed in two kinds of language are included in the notification message 108, embodiments are not limited thereto. Three or more messages in different languages may be included in the notification message 108, In this case, for example, priority level information may be included in the notification message 108. In a case where the terminal apparatus 101 supports the languages of a plurality of messages of the three or more messages, the priority level information indicates which language is to be used for displaying the message by priority.

Next, in S703, the CPU 502 transmits the notification message 108 generated in S702 to the push notification server 102.

Figure 8:
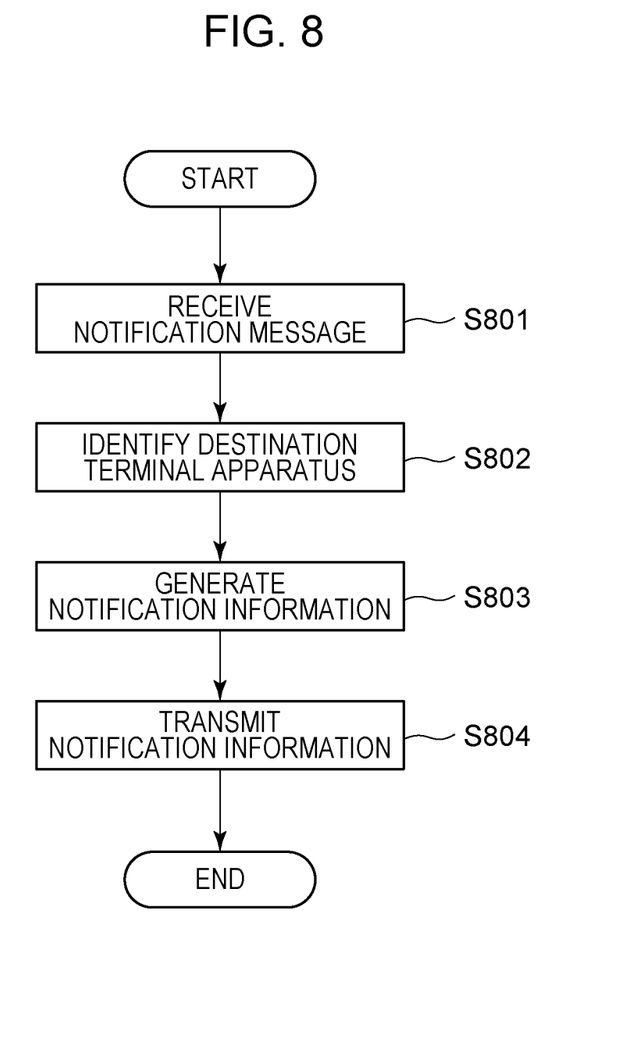
FIG. 8 is a flowchart illustrating processing to be executed by the push notification server.

FIG. 8 is a flowchart illustrating processing to be executed by the push notification server 102 according to this embodiment. The processes illustrated in the flowchart in FIG. 8 are implemented by a program stored in the ROM 602, for example, and read to the RAM 603 and executed by the CPU 601, for example.

First, in S801, the CPU 601 receives the notification message 108 from the communication apparatus 103.

Next, in S802, the CPU 601 identifies the terminal apparatus 101 registered by the registration processing as a target apparatus of the push notification.

Next, in S803, the CPU 601 generates notification information based on the notification message 108 received in S801. In other words, the CPU 601 converts the notification message 108 received in S801 to notification information. The notification information to be generated here is not the notification message 108 but is information having a different format from that of the notification message 108. However, by analyzing the notification information, the terminal apparatus 101 can recognize the information pieces included in the notification message 108 on which the notification information is based.

In this case, because the CPU 601 has recognized the identification information of the terminal apparatus 101 that is a destination of the notification information based on the registration processing, the notification information (or the content thereof) to be generated may be varied in accordance with the identification information of the terminal apparatus 101. More specifically, for example, in a case where the OS of the terminal apparatus 101 is iOS, which is indicated by the OS information included in the identification information of the terminal apparatus 101 identified in S802, the CPU 601 generates notification information based on a format for iOS. Also, for example, in a case where the OS of the terminal apparatus 101 is Android, which is indicated in the OS information included in the identification information of the terminal apparatus 101 identified in S802, the CPU 601 generates notification information based on a format for Android. The CPU 601 may vary the notification information (or the content thereof) to be generated in accordance with the type of the service providing server 105 to be utilized, for example.

In a case where the notification message 108 is encrypted or encoded, the CPU 601 may transmit the notification message 108 as it is without the conversion to the terminal apparatus 101 so that the terminal apparatus 101 is caused to decrypt or decode the notification message 108. For analysis of the notification message 108, the CPU 601 may perform the decrypt processing or decode processing on the notification message 108 and may then transmit the processed notification message 108 as it is to the terminal apparatus 101. After performing the decrypt processing or decode processing on the notification message 108, the CPU 601 may encrypt or encode the notification message 108 again and transmit the result to the terminal apparatus 101.

Next, in S804, the CPU 601 transmits the generated notification information to the terminal apparatus 101 through the service providing server 105.

Figure 2:
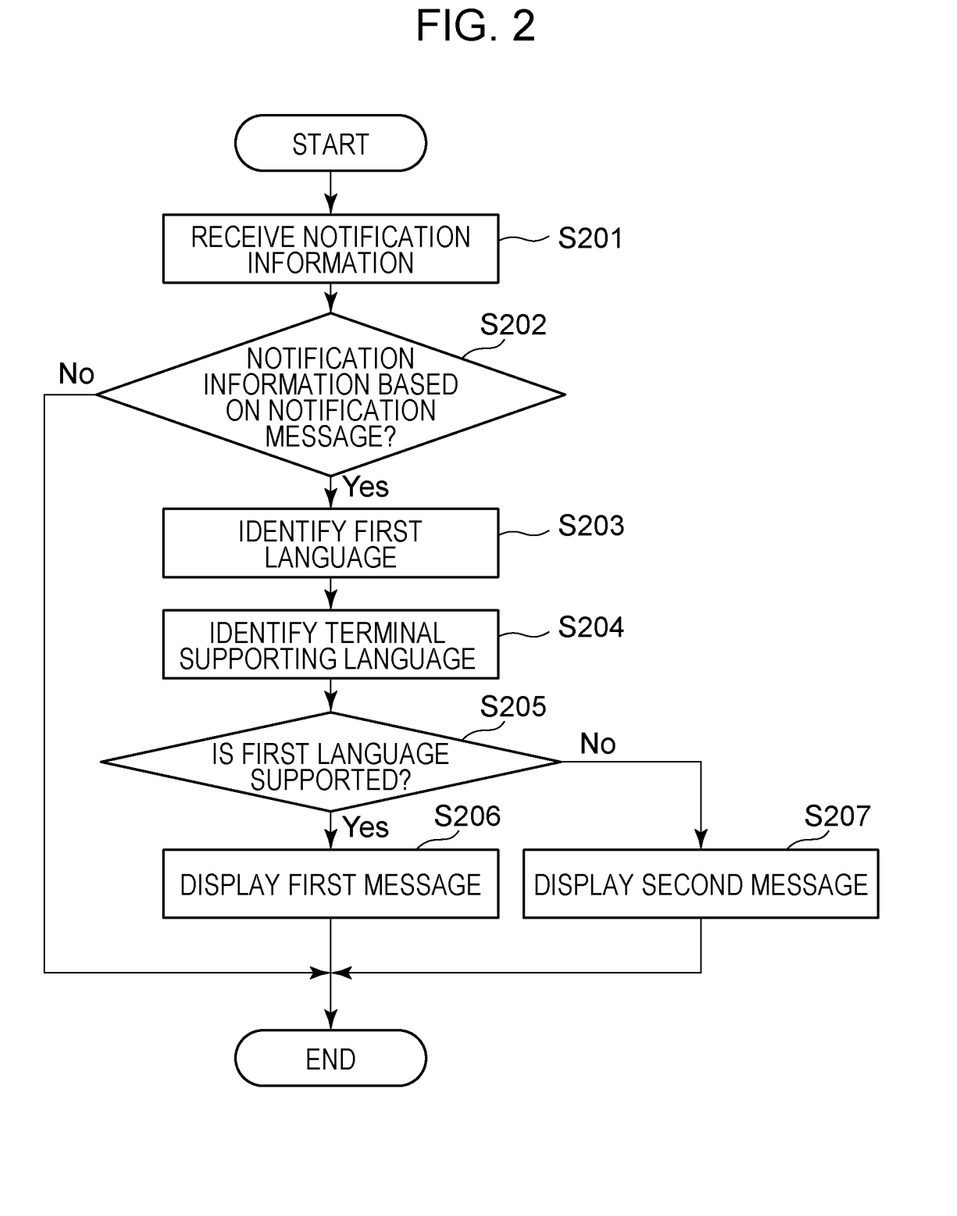
FIG. 2 is a flowchart illustrating processing to be executed by a terminal apparatus.

FIG. 2 is a flowchart illustrating processing to be executed by the terminal apparatus 101 according to this embodiment. The processes illustrated in the flowchart in FIG. 2 are implemented by the terminal-side application 106 stored in the ROM 611, for example, and read to the RAM 612 and executed by the CPU 613, for example.

When the notification information is received by the terminal apparatus 101 through the service providing server 105, the CPU 613 analyzes the notification information by using the OS of the terminal apparatus 101. Because the notification information includes information regarding the application corresponding to the notification information, the CPU 613 identifies which application the received notification information corresponds to. According to this embodiment, the notification information corresponds to the terminal-side application 106. Therefore, the CPU 613 transmits the notification information to the terminal-side application 106. The following processing to be executed by the terminal-side application 106 after the notification information is received may be executed in a state that the terminal-side application 106 does not run at the foreground.

Therefore, first in S201, the CPU 613 receives notification information by using the terminal-side application 106 and starts analyzing the notification information.

Next in S202, the CPU 613 determines whether the notification information is based on the notification message 108 transmitted from the PC-side application 107 or not. This determination specifically includes determining whether the notification information includes key/value format information, a specific character string, the language information 109, and information corresponding to the message 110 and the message 111, for example. If the determination results in YES, the CPU 613 moves to S203, if the determination results in NO, the processing ends without displaying the notification area 302.

Next, in S203, the CPU 613 analyzes the notification information and identifies the first language indicated by the language information 109.

Next, in S204, the CPU 613 obtains information regarding languages supported by the terminal apparatus 101 (terminal supporting languages) and identifies languages supported by the terminal apparatus 101. The CPU 613 may obtain information regarding languages supported by the terminal apparatus 101 from the OS of the terminal apparatus 101 or from information managed by the terminal-side application 106 or based on an input received from a user.

Next, in S205, the CPU 613 determines whether the languages supported by the terminal apparatus 101 identified in S204 include the first language identified in S203 or not. If the determination results in YES, the CPU 613 proceeds to S206. If the determination results in NO, the CPU 613 proceeds to S207.

In S206, the CPU 613 notifies the OS of the terminal apparatus 101 to newly display the notification area 302 based on the first message 110 on the display unit 608. Thus, the notification area 302 based on the first message 110 is newly displayed on the display unit 608.

In S207, the CPU 613 transmits a notification to the OS of the terminal apparatus 101 to newly display the notification area 302 based on the second message 111 on the display unit 608. Thus, the notification area 302 based on the second message 111 is newly displayed on the display unit 608.

According to this embodiment, even in a case where the terminal apparatus 101 does not support the first language, the message can be displayed in the second language. By extension, according to this embodiment, the message can be displayed more easily in a language readable by a user.

OTHER EMBODIMENTS

Having described that a message is displayed in the second language in a case where the terminal apparatus 101 does not support the first language, embodiments are not limited thereto. For example, in a case where the terminal apparatus 101 does not support the first language (NO in S205), the CPU 613 may determine whether the languages supported by the terminal apparatus 101 identified in S204 include the second language or not. If the determination results in YES, the CPU 613 may proceed to S207 where the notification area 302 based on the second message 111 is displayed. If the determination results in NO, the CPU 613 may not display any notification area 302 or may display a specific notification area 302 predetermined by the terminal-side application 106, for example. The specific notification area 302 predetermined by the terminal-side application 106 is an area that informs, in one of the languages supported by the terminal apparatus 101 or a predetermined language, for example, a user of that a notification regarding the printing apparatus 104 has been received.

In a case where, for example, the terminal apparatus 101 does not support the first language and the second language, the CPU 613 may communicate with the communication apparatus 103 or the push notification server 102 to request notification information for displaying the message in a language that is not the first language and not the second language. Based on the notification information received in response to the request, the notification area 302 including the message expressed in a language that is neither the first language nor the second language may be displayed. This is because the terminal apparatus 101 can access the other apparatuses though the terminal apparatus 101 cannot access the service providing server 105.

Having described above that the communication apparatus 103 transmits the notification message 108 to notify information regarding the printing apparatus 104, embodiments are not limited thereto. For example, the printing apparatus 104 by itself may generate the notification message 108 and transmit the notification message 108 to the push notification server 102 without through the communication apparatus 103 for the notification of information regarding the printing apparatus 104.

Having described above that the push notification is applied for notification to the terminal apparatus 101, a pull-type notification method may be applied in which notification information is transmitted to the terminal apparatus 101 in response to a request from the terminal apparatus 101, for example, for notification to the terminal apparatus 101.

Having described above that the structure of the notification message 108 to be transmitted from the communication apparatus 103 is devised as a control that allows display of a message not only in the first language but also in the second language based on notification information, embodiments are not limited thereto. For example, the notification message 108 to be transmitted from the communication apparatus 103 may not include the second message 111. In this case, when notification information is generated in the push notification server 102, a control that allows a message to be displayed not only in the first language but also in the second language based on the notification information is executed by the push notification server 102. In other words, the push notification server 102 adds information corresponding to the second message 111 to the notification information to allow a message to be displayed not only in the first language but also in the second language based on the notification information.

Figure 4:
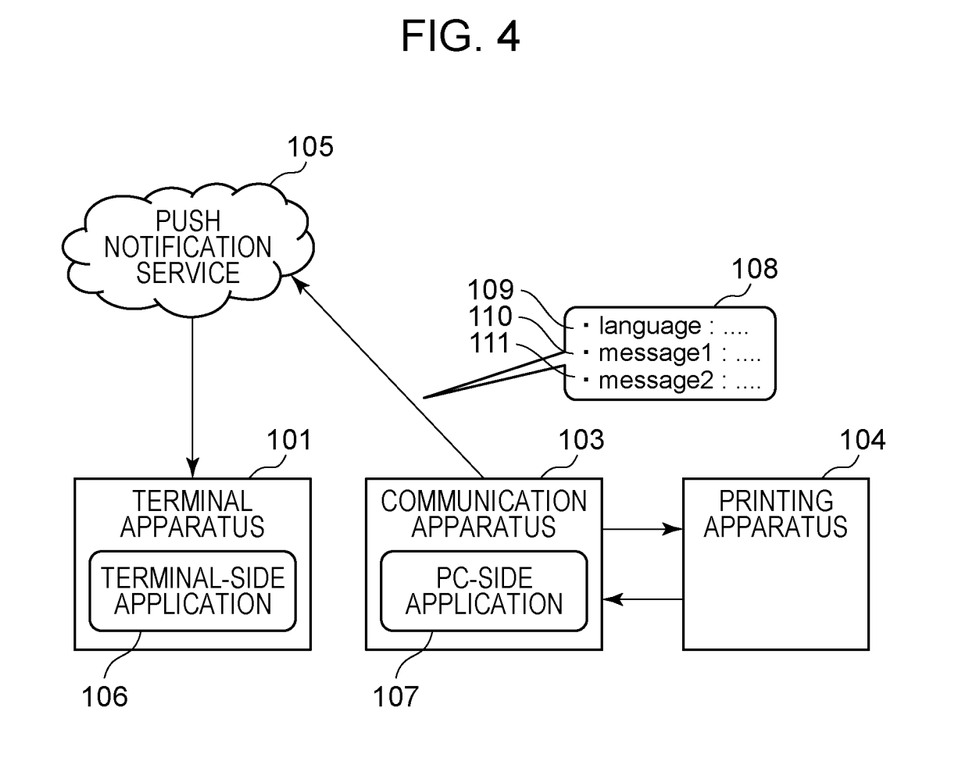
FIG. 4 is a diagram illustrating an example of a configuration of a communication system.

Having described above that the notification is performed by using the communication system illustrated in FIG. 1, embodiments are not limited thereto. For example, as illustrated in FIG. 4, the communication system may not include the push notification server 102.

In this case, first in the registration processing, the communication apparatus 103 manages the identification information of the PC-side application 107 and the identification information of the terminal apparatus 101 in association. The registration processing is implemented by, for example, connecting the terminal apparatus 101 to the communication apparatus 103 by a wireless communication method or a wired communication method and transmitting the identification information of the terminal apparatus 101 to the communication apparatus 103 through the connection. In response to a notification from the printing apparatus 104, the communication apparatus 103 generates notification information based on the notification message 108 in the same manner as that by the push notification server 102 according to the aforementioned embodiment. The communication apparatus 103 transmits the notification information through the service providing server 105 to the terminal apparatus 101 managed by the registration processing.

The present disclosure can be implemented by processing including supplying a program implementing one or more functions of the aforementioned embodiments to a system or an apparatus over a network or through a storage medium and, by one or more processors in a computer in the system or apparatus, reading and executing the program. The present disclosure can also be implemented by a circuit (such as an application-specific integrated circuit (ASIC)) implementing the one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-113946 filed Jun. 14, 2018, which is hereby incorporated by reference herein in its entirety.

What is claimed is:

1. A control method for a communication system including a communication apparatus and a terminal apparatus having a display unit, the control method comprising:
    transmitting, by the communication apparatus, message information including first language information for expressing a message indicating predetermined information in a first language and second language information for expressing the message indicating the predetermined information in a second language different from the first language;
    receiving, by the terminal apparatus, both information for displaying on the display unit the message indicating the predetermined information based on the message information in the first language and information for displaying on the display unit the message indicating the predetermined information based on the message information in the second language;
    executing, in a case where the first language corresponds to a terminal supporting language that is at least one of a plurality of languages corresponding to a language information held by an operating system of the terminal apparatus, a process that displays on the display unit the message indicating the predetermined information based on the message information in the first language; and
    executing, in a case where the first language does not correspond to the terminal supporting language, a process that displays on the display unit the message indicating the predetermined information based on the message information in the second language,
    wherein the information for displaying on the display unit the message indicating the predetermined information based on the message information in the first language and the information for displaying on the display unit the message indicating the predetermined information based on the message information in the second language are transmitted from a predetermined notification server to the terminal apparatus, and
    wherein communication between the predetermined notification server and the terminal apparatus is one-way communication in which the terminal apparatus is unable to access the predetermined notification server and in which the predetermined notification server is able to access the terminal apparatus.

2. The control method according to claim 1, further comprising identifying, by the communication apparatus, an apparatus supporting language selected by a user on a screen displayed on the communication apparatus.

3. The control method according to claim 2, wherein the apparatus supporting language is a language selected by the user based on installation of a predetermined application in the communication apparatus.

4. The control method according to claim 3, wherein the predetermined application is an application configured to control a printing apparatus.

5. The control method according to claim 2, wherein the apparatus supporting language is a language selected by the user on a selection screen displayed by a predetermined application installed in the communication apparatus for selecting a language to be displayed by the predetermined application.

6. The control method according to claim 5,
    wherein the first language varies in accordance with which language has been selected by the user on the selection screen, and
    wherein the second language is fixed irrespective of which language has been selected by the user on the selection screen.

7. The control method according to claim 1, wherein the second language is English.

8. The control method according to claim 1, further comprising requesting, in a case where all languages identified based on the message information do not correspond to the terminal supporting language, information for expressing the message indicating the predetermined information in a language other than the all languages identified based on the message information by the terminal apparatus without through the predetermined notification server.

9. The control method according to claim 1, wherein the terminal supporting language is a language selected by a user on a screen displayed on the display unit by a setting application configured to select a language to be displayed by the operating system of the terminal apparatus.

10. The control method according to claim 1,
    wherein, in the case where the first language corresponds to the terminal supporting language, the message indicating the predetermined information based on the message information is not displayed on the display unit in the second language and the message indicating the predetermined information based on the message information is displayed on the display unit in the first language, and
    wherein, in the case where the first language does not correspond to the terminal supporting language, the message indicating the predetermined information based on the message information is not displayed on the display unit in the first language and the message indicating the predetermined information based on the message information is displayed on the display unit in the second language.

11. The control method according to claim 1, wherein the information received by the terminal apparatus and based on the message information has a format varying in accordance with a type of the operating system of the terminal apparatus.

12. The control method according to claim 1, further comprising transmitting information regarding the operating system of the terminal apparatus to a server configured to relay communication between the communication apparatus and the terminal apparatus,
wherein the server converts the message information to information based on the message information in a format based on a type of the operating system of the terminal apparatus.

13. The control method according to claim 1, wherein the message indicating the predetermined information based on the message information is displayed by a push notification function of the operating system of the terminal apparatus.

14. The control method according to claim 1, wherein the predetermined information is information regarding a printing apparatus.

15. The control method according to claim 14, further comprising transmitting to the printing apparatus a print job to execute printing.

16. The control method according to claim 15, wherein the printing apparatus is an apparatus configured to perform printing based on an ink-jet method.

17. A control method for a communication apparatus configured to transmit a notification to a terminal apparatus having a display unit, the control method comprising:
acquiring predetermined information;
transmitting, by the communication apparatus, message information including first language information for expressing a message indicating the predetermined information in a first language and second language information for expressing the message indicating the predetermined information in a second language different from the first language;
receiving, by the terminal apparatus, both information for displaying on the display unit the message indicating the predetermined information based on the message information in the first language and information for displaying on the display unit the message indicating the predetermined information based on the message information in the second language;
executing, in a case where the first language corresponds to a terminal supporting language that is at least one of a plurality of languages corresponding to a language information held by an operating system of the terminal apparatus, a process that displays on the display unit the message indicating the predetermined information based on the message information in the first language; and
executing, in a case where the first language does not correspond to the terminal supporting language, a process that displays on the display unit the message indicating the predetermined information based on the message information in the second language,
wherein the information for displaying on the display unit the message indicating the predetermined information based on the message information in the first language and the information for displaying on the display unit the message indicating the predetermined information based on the message information in the second language are transmitted from a predetermined notification server to the terminal apparatus, and
wherein communication between the predetermined notification server and the terminal apparatus is one-way communication in which the terminal apparatus is unable to access the predetermined notification server and in which the predetermined notification server is able to access the terminal apparatus.

18. A control method for a terminal apparatus having a display unit, the control method comprising:
receiving information based on message information including first language information for expressing a message indicating predetermined information in a first language and second language information for expressing the message indicating the predetermined information in the second language different from the first language;
receiving, by the terminal apparatus, both information for displaying on the display unit the message indicating the predetermined information based on the message information in the first language and information for displaying on the display unit the message indicating the predetermined information based on the message information in the second language;
executing, in a case where the first language identified with the information based on the message information corresponds to a terminal supporting language that is at least one of a plurality of languages corresponding to a language information helf by an operating system of the terminal apparatus, a process that displays on the display unit the message indicating the predetermined information based on the message information in the first language; and
executing, in a case where the first language identified with the information based on the message information does not correspond to the terminal supporting language, a process that displays on the display unit the message indicating the predetermined information based on the message information in the second language,
wherein the information for displaying on the display unit the message indicating the predetermined information based on the message information in the first language and the information for displaying on the display unit the message indicating the predetermined information based on the message information in the second language are transmitted from a predetermined notification server to the terminal apparatus, and
wherein communication between the predetermined notification server and the terminal apparatus is one-way communication in which the terminal apparatus is unable to access the predetermined notification server and in which the predetermined notification server is able to access the terminal apparatus.

19. The control method according to claim 18, wherein the terminal supporting language is a language selected by a user on a screen displayed on the display unit by a setting application configured to select a language to be displayed by the operating system of the terminal apparatus.

20. The control method according to claim 18,
wherein, in the case where the first language corresponds to the terminal supporting language, the message indicating the predetermined information based on the message information is not displayed on the display unit in the second language and the message indicating the predetermined information based on the message information is displayed on the display unit in the first language, and wherein, in the case where the first language does not correspond to the terminal supporting language, the message indicating the predetermined information based on the message information is not displayed on the display unit in the first language and the message indicating the predetermined information based on the message information is displayed on the display unit in the second language.

21. The control method according to claim 18, wherein the predetermined information is information regarding a printing apparatus.

22. The control method according to claim 18, further comprising transmitting to the printing apparatus a print job to execute printing.

23. A communication system including a communication apparatus and a terminal apparatus having a display unit, the communication system comprising:
   at least one processor of the communication apparatus; and
   at least one processor of the terminal apparatus,
   wherein the at least one processor of the communication apparatus executes:
   transmitting message information including first language information for expressing a message indicating predetermined information in a first language and second language information for expressing the message indicating the predetermined information in a second language different from the first language,
   wherein the at least one processor of the terminal apparatus executes:
   receiving both information for displaying on the display unit the message indicating the predetermined information based on the message information in the first language and information for displaying on the display unit the message indicating the predetermined information based on the message information in the second language;
   executing, in a case where the first language corresponds to a terminal supporting language that is at least one of a plurality of languages corresponding to a language information held by an operating system of the terminal apparatus, a process that displays on the display unit the message indicating the predetermined information based on the message information in the first language; and
   executing, in a case where the first language does not correspond to the terminal supporting language, a process that displays on the display unit the message indicating the predetermined information based on the message information in the second language,
   wherein the information for displaying on the display unit the message indicating the predetermined information based on the message information in the first language and the information for displaying on the display unit the message indicating the predetermined information based on the message information in the second language are transmitted from a predetermined notification server to the terminal apparatus, and
   wherein communication between the predetermined notification server and the terminal apparatus is one-way communication in which the terminal apparatus is unable to access the predetermined notification server and in which the predetermined notification server is able to access the terminal apparatus.

* * * * *